United States Patent
Kim et al.

(10) Patent No.: US 8,723,957 B2
(45) Date of Patent: *May 13, 2014

(54) POWER CONTROL METHOD OF GESTURE RECOGNITION DEVICE BY DETECTING PRESENCE OF USER

(75) Inventors: Sungun Kim, Seoul (KR); Soungmin Im, Seoul (KR)

(73) Assignee: LG Electronics Inc., Seoul (KR)

(*) Notice: Subject to any disclaimer, the term of this patent is extended or adjusted under 35 U.S.C. 154(b) by 334 days.

This patent is subject to a terminal disclaimer.

(21) Appl. No.: 12/959,036

(22) Filed: Dec. 2, 2010

(65) Prior Publication Data

US 2011/0134251 A1     Jun. 9, 2011

(30) Foreign Application Priority Data

Dec. 3, 2009  (KR) .................. 10-2009-0119225

(51) Int. Cl.
*H04N 5/33*     (2006.01)
*H04N 3/09*     (2006.01)
*G01J 5/00*     (2006.01)

(52) U.S. Cl.
CPC .................. *H04N 5/33* (2013.01); *H04N 5/332* (2013.01); *H04N 3/09* (2013.01); *G01J 2005/0077* (2013.01); *Y10S 901/17* (2013.01)
USPC ........ 348/164; 348/69; 348/372; 348/206.16; 348/333.13; 348/14.12; 713/300; 340/539.11; 901/17

(58) Field of Classification Search
CPC ...... B25J 18/02; B25J 18/025; B25J 19/0091; B25J 19/023; B25J 19/06; B25J 5/007; B25J 9/00; B25J 9/0003; B25J 9/041; B25J 9/10; B25J 9/101; B62D 57/032; G01J 2005/0077; G01J 5/02; G01S 17/06; G05D 1/0225; G05D 1/0234; G05D 1/0242; G05D 1/0246; G05D 1/0251; G05D 1/0255; G05D 1/027; G05D 1/0272; G05D 1/0274; H04N 2101/00; H04N 2201/0084; H04N 3/09; H04N 5/232; H04N 5/23248; H04N 5/33; H04N 5/332; H04N 5/772
USPC .................. 700/245; 715/700; 345/175, 700; 901/17; 348/209.99, 164

See application file for complete search history.

(56) References Cited

U.S. PATENT DOCUMENTS 6,400,392 B1 * 6/2002 Yamaguchi et al. ....... 348/14.12
6,633,231 B1 * 10/2003 Okamoto et al. ......... 340/539.11

(Continued)

FOREIGN PATENT DOCUMENTS

CN     1918532 A      2/2007
CN    101174193 A     5/2008

(Continued)

OTHER PUBLICATIONS

A machine-generated translation is provided for CN 101174193.

(Continued)

*Primary Examiner* — Sath V Perungavoor
*Assistant Examiner* — Dakshesh Parikh
(74) *Attorney, Agent, or Firm* — Birch, Stewart, Kolasch & Birch, LLP

(57) ABSTRACT

Provided is a method which reduces the power consumption of a camera for detecting a user's gesture, in a device that detects the user's gesture and performs a command corresponding to the detected gesture. Moreover, provided is a method which turns off a camera or drives the camera in an ultra low power mode when there is no user input, and detects presence of a user to activate the camera.

22 Claims, 13 Drawing Sheets

(56) References Cited

U.S. PATENT DOCUMENTS

| | | |
|---|---|---|
| 2003/0132950 A1* | 7/2003 | Surucu et al. .................. 345/700 |
| 2006/0220843 A1* | 10/2006 | Broad et al. ............. 340/539.23 |
| 2007/0192910 A1* | 8/2007 | Vu et al. .......................... 901/17 |
| 2007/0198128 A1 | 8/2007 | Ziegler et al. |
| 2009/0077406 A1 | 3/2009 | Chang |

FOREIGN PATENT DOCUMENTS

| | | | |
|---|---|---|---|
| CN | 101393539 A | 3/2009 | |
| JP | 2001-88609 A | 4/2001 | |
| JP | 2007-306180 A | 11/2007 | |
| KR | 10-2009-0112979 A | 10/2009 | |
| WO | WO 2005/057921 A2 | 6/2005 | |

OTHER PUBLICATIONS

A machine-generated translation is provided for CN 101393539.

\* cited by examiner

US 8,723,957 B2

POWER CONTROL METHOD OF GESTURE RECOGNITION DEVICE BY DETECTING PRESENCE OF USER

CROSS-REFERENCE TO RELATED APPLICATIONS

The present application claims priority under 35 U.S.C. 119 and 35 U.S.C. 365 to Korean Patent Application No. 10-2009-0119225 filed on Dec. 3, 2009, which is hereby incorporated by reference in its entirety.

BACKGROUND

The present disclosure relates to a power control method of a device controllable by a user's gesture. More specifically, the present invention proposes a method which reduces the power consumption of a camera for detecting a user's gesture, in a device that detects the user's gesture and performs a command corresponding to the detected gesture.

Recently, user input devices are being diversified, and moreover, provided are devices that recognize a user's gesture to receive a command.

Devices which recognize a user's gesture to receive a command use a motion sensor such as G sensor for recognizing the user's gesture, and capture an image with a camera to process the captured image.

In a method that captures an image with a camera to recognize a gesture, the camera is required to maintain a turn-on state for detecting a user's gesture. In devices that receive user inputs at lengthy intervals like televisions (TVs), however, a power is wasted when a camera is turned on for a long time.

SUMMARY

Embodiments of the present invention provide a method which reduces the power consumption of a device controllable by a gesture.

Embodiments also provide a method which controls the power of a camera for detecting a gesture in a device controllable by the gesture, thereby reducing power consumption.

In one embodiment, provided is a method of turning on a computing device controllable by gesture. The method includes: detecting presence of an object near a camera which is connected to the computing device; and switching an operation mode of the camera to a mode for detecting a gesture of a user.

In another embodiment, provided is a computing device controllable by gesture. The computing device includes: a presence sensor detecting presence of a user; a camera interface connected to a camera, and receiving a gesture of the user image from the camera; a storage unit storing commands corresponding to gestures which are inputted by the user; and a controller turning on the camera, analyzing the received gesture image, and executing a command corresponding to the gesture, when the presence sensor detects the presence of the user.

In another embodiment, provided is a camera which is connected to a computing device controllable by gesture of a user and captures a gesture image of the user. The camera includes: an image receiver capturing the gesture image of the user; an illuminator providing illumination; an image output unit transferring an image which is captured by the image receiver; and a controller turning on the camera when presence of the user is detected, and controlling a power mode of the camera according to a gesture input of the user.

According to embodiments, by controlling the power of a camera for detecting a gesture in a device controllable by the gesture, power consumption can be reduced.

According to embodiments, a gesture detecting system can be turned on without manipulation of a user.

It is to be understood that both the foregoing general description and the following detailed description of the present invention are exemplary and explanatory and are intended to provide further explanation of the invention as claimed. The details of one or more embodiments are set forth in the accompanying drawings and the description below. Other features will be apparent from the description and drawings, and from the claims.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a computing device, a camera and a method for controlling the same according to the present invention will be described with reference to the accompanying drawings in detail.

Hereinafter, embodiments will be described in more detail with reference to the accompanying drawings.

Figure 1:
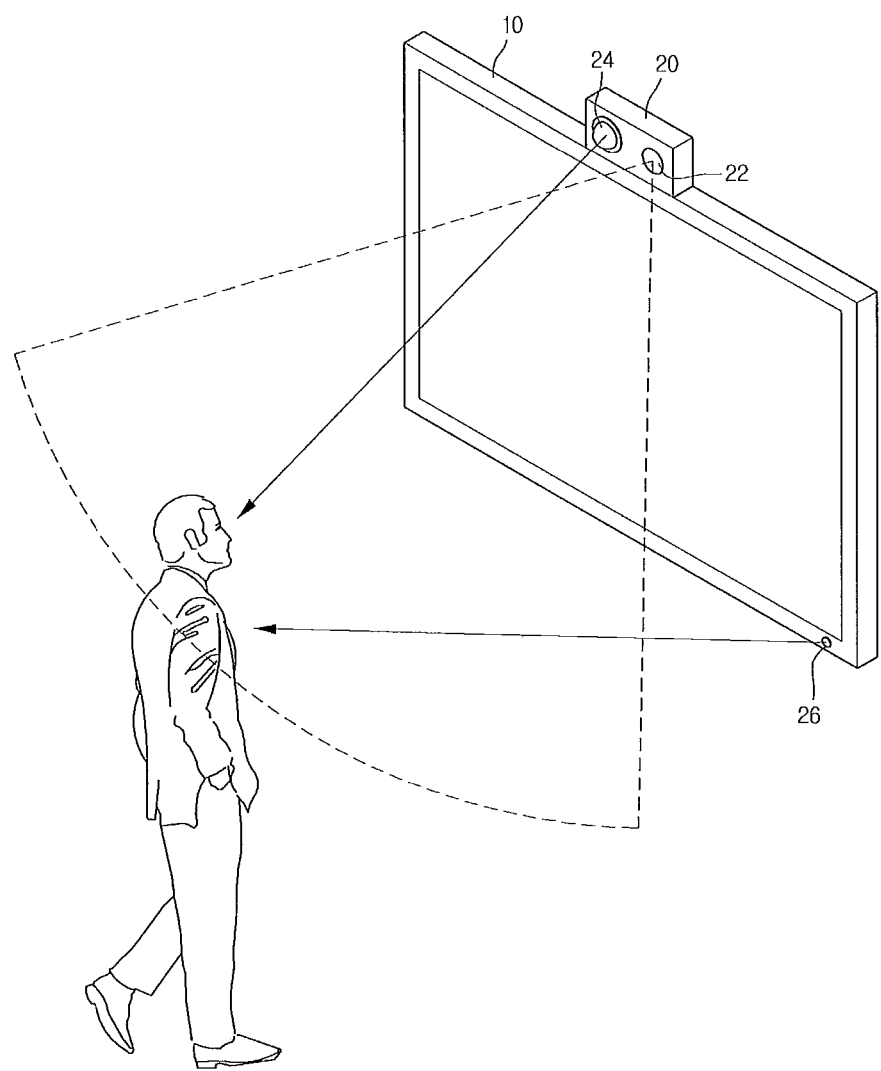
FIG. 1 is a diagram illustrating a method of recognizing a user's gesture according to an embodiment of the present invention.

FIG. 1 is a diagram illustrating a method of recognizing a user's gesture according to an embodiment. In FIG. 1, a computing device 10 and a camera 20 connected to or mounted on the computing device 10 are illustrated.

As a processing device that performs an arbitrary function, the computing device 10 includes an arbitrary device that is controlled by a user's gesture. The user's gesture is used as a user input. The computing device 10 may receive the user's gesture image from the camera 20 to detect the user's gesture, and perform an operation based on the gesture. The computing device 10 may be a device that includes a display like televisions (TVs) such as DTVs, monitors and Personal Computers (PCs), or may be a device that does not include a display like set-top boxes, PC bodies and audio devices.

As a device that captures a user's gesture, the camera may be integrated with the computing device 10, or as an optionally independent device, the camera 20 may be connected to the computing device 10.

The camera 20 includes an image receiver 24 capturing an image, and an illuminator 22 providing illumination. According to embodiments, the illuminator 22 may be configured as a separate device.

The camera 20 may be an infrared camera, the image receiver 24 may be an infrared CMOS sensor array, and the illuminator 22 may be an infrared illuminator.

The computing device 10 may include a presence sensor that detects whether a user exists within a certain radius from it, i.e., presence of the user. The presence sensor 26 may include at least one of a thermal infrared sensor, an ultrasonic sensor, and an infrared sensor. When the user is disposed within a certain distance from the camera (this detection is made by the presence sensor 26), this is notified to a controller of the computing device 10 by the presence sensor 26, and thus the controller turns on the camera 20 that has been turned off.

As illustrated in FIG. 1, when the user is disposed within the detectable range of the presence sensor 26, the camera is turned on and thereby is in a gesture-detectable state. Once the camera 20 is turned on, when the user inputs or makes a predetermined gesture in front of or near the camera 20, the camera 20 captures the gesture, and the captured gesture image is transferred to the computing device 10. The computing device 10 extracts and distinguishes a gesture pattern from the gesture image obtained from the camera 20, and performs a corresponding command/operation according to the distinguished gesture. That is, an operation or selection corresponding to the identified gesture is performed. For instance, if the user's gesture was for increasing the volume of the TV, then the volume of the TV is increased.

When presence of the user is detected in a state where the computing device 10 is turned off (e.g., the presence sensor is operating), then the camera 20 is turned on. Then when the user takes the turn-on gesture of the computing device 10 in front of or near the camera that is now turned on, the turn-on gesture is captured by the camera which in turn causes the computing device 10 to be turned on. Subsequently, the computing device 10 may be controlled through various gesture inputs.

Even in a state where the computing device 10 is turned on, the camera 20 is turned off when the presence of the user is not detected. Then, when the presence of the user is detected, the camera 20 is turned on, and the computing device 10 may be controlled through various gesture inputs.

Figure 2:
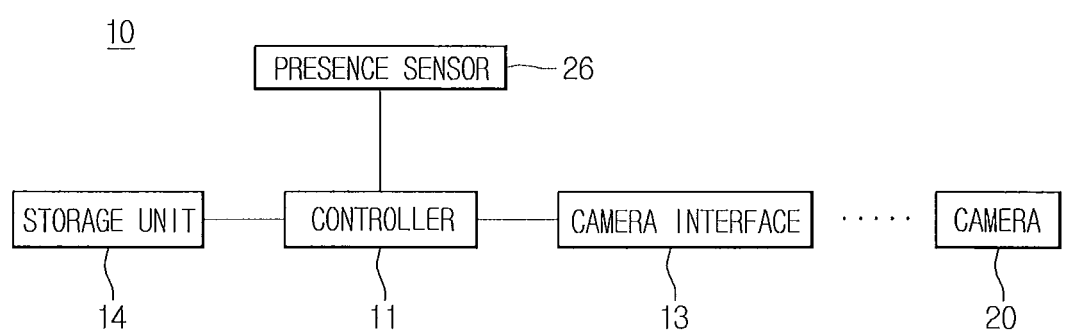
FIG. 2 is a block diagram illustrating a computing device according to an embodiment of the present invention.

FIG. 2 is a block diagram illustrating the computing device 10 according to an embodiment.

Referring to FIG. 2, the computing device 10 according to an embodiment includes a presence sensor 26, a camera interface 13, a storage unit 14, and a controller 11. Herein, the presence sensor detects a presence of a user near or in front of the presence sensor 26. The camera interface 13 is connected to the camera 20 and receives a user's gesture image from the camera 20. The storage unit 14 stores commands corresponding to gestures that are inputted by the user. The controller 11 may process the received gesture image, analyze the pattern of gesture to distinguish the gesture, and perform a command corresponding to the distinguished gesture.

According to an embodiment, the camera 20 may be integrated with the computing device 10, or may be attached/detached to/from the computing device 10. As a separate device, alternatively, the camera 20 may be connected to the computing device 10 via a wired connection or a wireless connection.

The camera interface 13 may be a connector, a wired communication module or a wireless communication module for connecting the camera 20 and the computing device 10. The camera interface 13 transfers an image captured by the camera 20 to the controller 11.

The storage unit 14 may be an arbitrary storage medium such as Read Only Memory (ROM), Electrical Erasable Programmable Read Only Memory (EEPROM), flash memory or Hard Disk Driver (HDD). The controller 11 stores commands corresponding to the user's gesture input in the storage unit 14.

The presence sensor 26 may include a thermal infrared sensor, an ultrasonic sensor, an infrared sensor, etc. According to embodiments, the presence sensor 26 may be configured independently of the computing device 10 and be connected to the computing device 10 via a wired connection or a wireless connection. The presence sensor 26 may be included in the camera 20 instead of the computing device 10.

The controller 11 may be a general processor or a dedicated processor, and may be configured in an arbitrary scheme such as Application Specific Integrated Circuit (ASIC) or Field Programmable Gate Array (FPGA). When the presence sensor 26 detects presence of the user, the controller 11 may turn on the camera 20 and drive the camera 20 in a gesture-detectable state. According to embodiments, as described below, the camera 20 may be configured to detect presence of the user.

Figure 3:
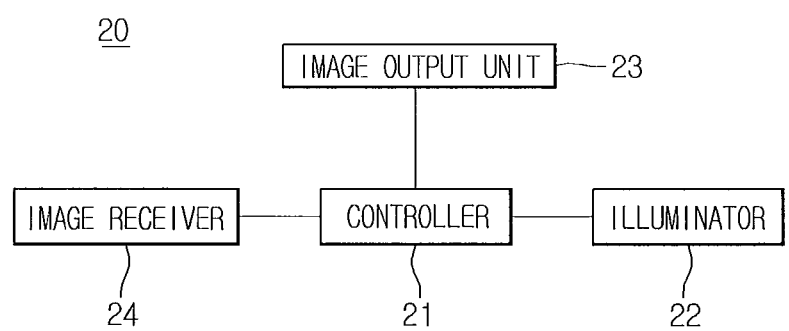
FIG. 3 is a block diagram illustrating a camera according to an embodiment of the present invention.

FIG. 3 is a block diagram illustrating the camera 20 according to an embodiment.

Referring to FIG. 3, the camera 20 includes an image receiver 24, an illuminator 22, an image output unit 23, and a controller 21. Herein, the image receiver 24 captures a user's gesture image. The illuminator 22 provides illumination. The image output unit 23 converts an image captured by the image receiver 24 into a format capable of being processed by the computing device 10. The controller 21 controls the overall operation of the camera 20, and controls the power mode of the camera 20 according to the user's gesture input.

The camera 20 is in a turn-off state while there is no user input, and then when the presence sensor 26 detects the presence of a user, the camera 20 is turned on and driven in a state that may detect the user's gesture. According to embodiments, the camera 20 operates in an ultra low power mode for detecting the presence of the user while there is no user input, and then when the presence of the user is detected, the camera 20 is driven in a mode for detecting the user's gesture.

The camera 20 may be an infrared camera, and the image receiver 24 may be an infrared CMOS sensor array. The illuminator 22 may be an infrared light source.

When the camera 20 is integrated with the computing device 10, all or a portion of functions (e.g., gesture detection and recognition functions) performed by the controller 21 of the camera 20 may be performed by the controller 11 of the computing device 10.

Figure 4:
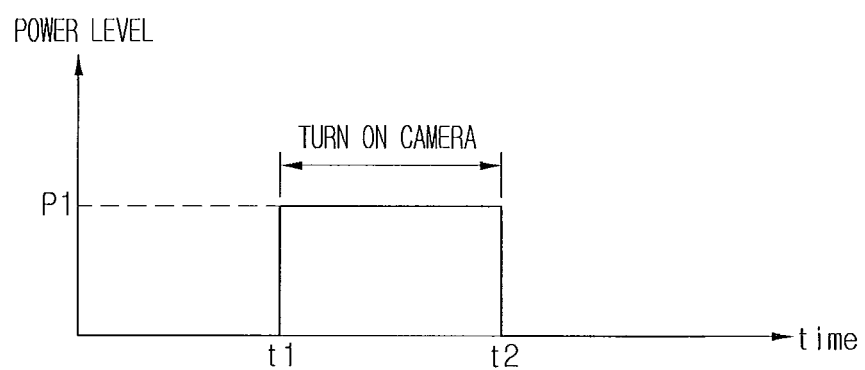
FIG. 4 is a diagram illustrating a power control method of a camera according to an embodiment of the present invention.

FIG. 4 is a diagram illustrating a power control method of the camera 20 according to an embodiment.

Referring to FIG. 4, when there is no user input, the camera 20 is turned off and does not operate. At a time t1, when the presence of the user is detected by the presence sensor 26, the camera 20 is driven at a power level P1 and enters into an operation mode for detecting the user's gesture. At a time t2, when the user's gesture is not inputted for a certain time or the presence of the user is not detected, the camera 20 is turned off.

When the camera 20 enters into an operation mode for detecting the user's gesture, this information may be displayed to the user. For example, an indicator such as Light Emitting Diode (LED) may be disposed near the presence sensor 26, and thus it may display or indicate that the camera 20 has entered into the operation mode.

Figure 5:
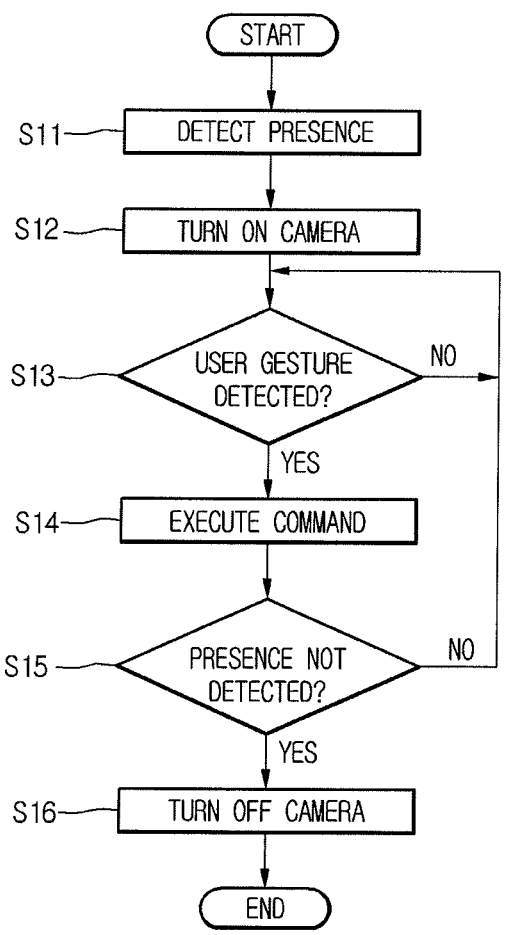
FIG. 5 is a flowchart illustrating a method of turning on a camera for gesture detection according to another embodiment of the present invention.

FIG. 5 is a flowchart illustrating a method of turning on a camera for gesture detection according to another embodiment.

Referring to FIG. 5, when the presence of a user is detected by the presence sensor 26 in operation S11, the camera is turned on in operation S12. When the user's gesture is detected in operation S13, the camera 20 executes a command corresponding to the user's gesture in operation S14. When the user's gesture is not detected in operation S13, the camera 20 waits in a turn-on state.

When the presence of the user is not detected in operation S15, e.g., when the presence of the user is no longer detected or the user's gesture is not inputted for a certain time duration, the camera 20 is turned off in operation S16. When the presence of the user is detected in operation S15, the camera 20 waits in a turn-on state.

According to an embodiment, the camera 20 is turned on, in which case the camera 20 may have a plurality of power modes. For example, the camera 20 may have a high power mode and a low power mode. The camera 20 operates in the low power mode for performing a low-performance recognition while there is no user input, and when an active input or a predetermined input is received from the user, the camera 20 switches a power mode from the low power mode to the high power mode for performing a high-performance recognition. The active input may be a specific gesture input, and causes the camera 20 to switch from the low power mode to the high power mode.

The low power mode is a mode in which the user may input an active input for activating the camera 20 in order to initiate the input of a gesture, and the high power mode is an operation mode in which the camera 20 may receive and process more sub-divided gesture inputs than the low power mode. Accordingly, when the active input is a gesture input, the active gesture is a large and slow gesture that may be detected even in the low power mode.

A large and slow gesture may be detected in the low power mode, and a relatively small and fast gesture may be detected in the high power mode. That is, the camera 20 may detect more gestures in the high power mode than the low power mode.

Figure 6:
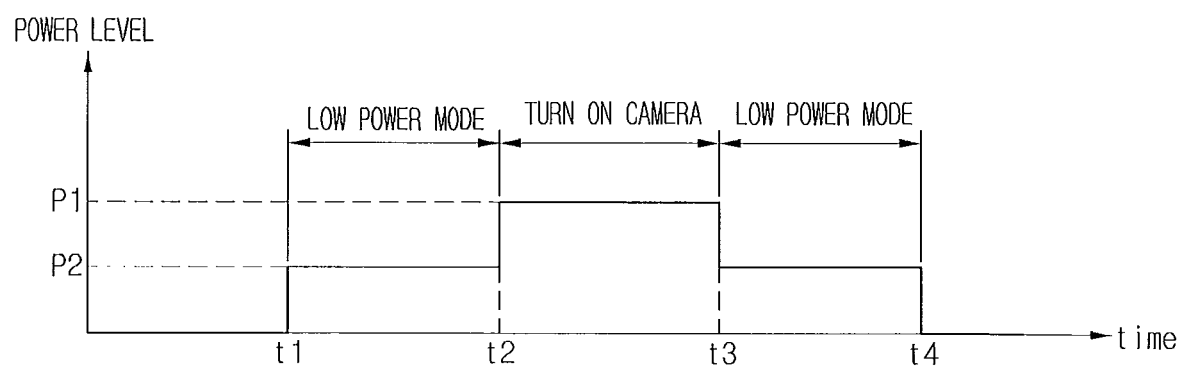
FIG. 6 is a diagram illustrating a method of driving a camera in a plurality of power modes, according to an embodiment of the present invention.

Referring to FIG. 6, the camera 20 is in a turn-off state while there is no user input. Then, when the presence of the user is detected by the presence sensor at a time t1, the camera 20 operates at a power level P2. As a low power level, the power level P2 enables only low-performance recognition of active gestures or predetermined gestures that can switch the mode of the camera to the high power mode.

At a time t2, when the user inputs an active gesture, the camera 20 enters into the high power mode for detecting all gestures of the user. In the high power mode, the camera 20 operates normally, and may capture even a small and fast gesture.

The power mode of the camera 20 may be controlled by controlling the driving factors of the camera 20 or by controlling the driving factors of the illuminator 22. For example, the power mode of the camera 20 may be controlled by controlling the frame rate thereof or by controlling one or more of a clock speed, a resolution, a shutter speed or the like of the camera according to the frame rate thereof. Also, the power mode of the camera 20 may be controlled by controlling the illumination intensity of the illuminator 22. That is, setting can be made in the camera to provide illumination only to a distance relatively close from the computing device 10 in the low power mode, but setting can be made in the camera to provide illumination even to a distance relatively far from the computing device 10 in the high power mode.

All or a portion of the driving factors are set to low values in the low power mode, and all or a portion of the driving factors are changed to relatively high values in the high power mode. Therefore, the power mode of the camera 20 may be changed. The power mode of the camera 20 may be controlled by changing the frame rate of the camera 20. The detailed values of the driving factors may vary according to the kinds of computing devices 10 or specific applications.

Figure 7:
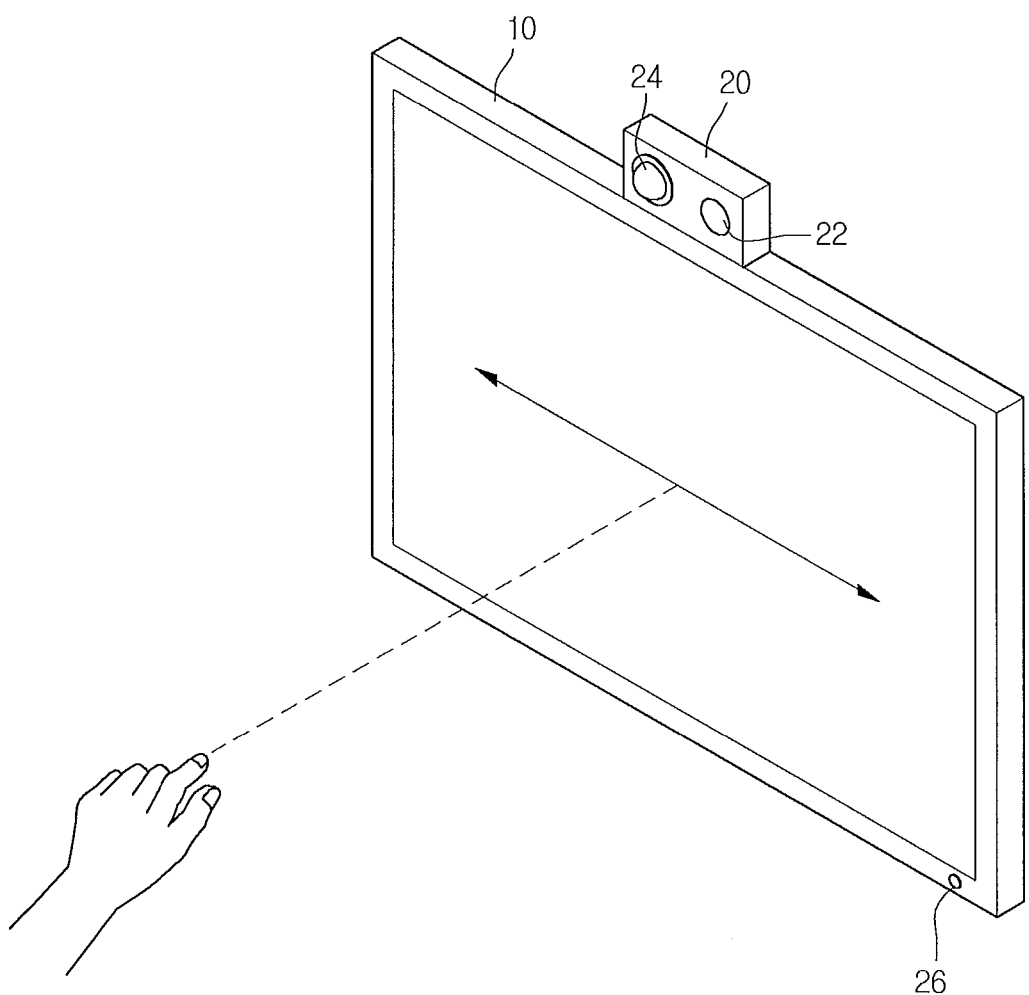
FIG. 7 is a diagram illustrating an active gesture for changing a power mode of a camera according to an embodiment of the present invention.

FIG. 7 is a diagram illustrating an active gesture for changing a power mode of a camera according to an embodiment.

A gesture, where a user shakes a finger from side to side at a slow speed toward the computing device 10, may be set as an active gesture which causes the camera to switch to the high power mode. The active gesture may be changed according to embodiments, and may be a gesture that is relatively large and slow, and enables the analysis of a pattern even with a low performance camera. In addition, the designated user input/gesture may be set as the active gesture such as the shaking of the user's hand from side to side or upward and downward, or a drawing of a specific shape such as polygon by the user's hand.

Figure 8:
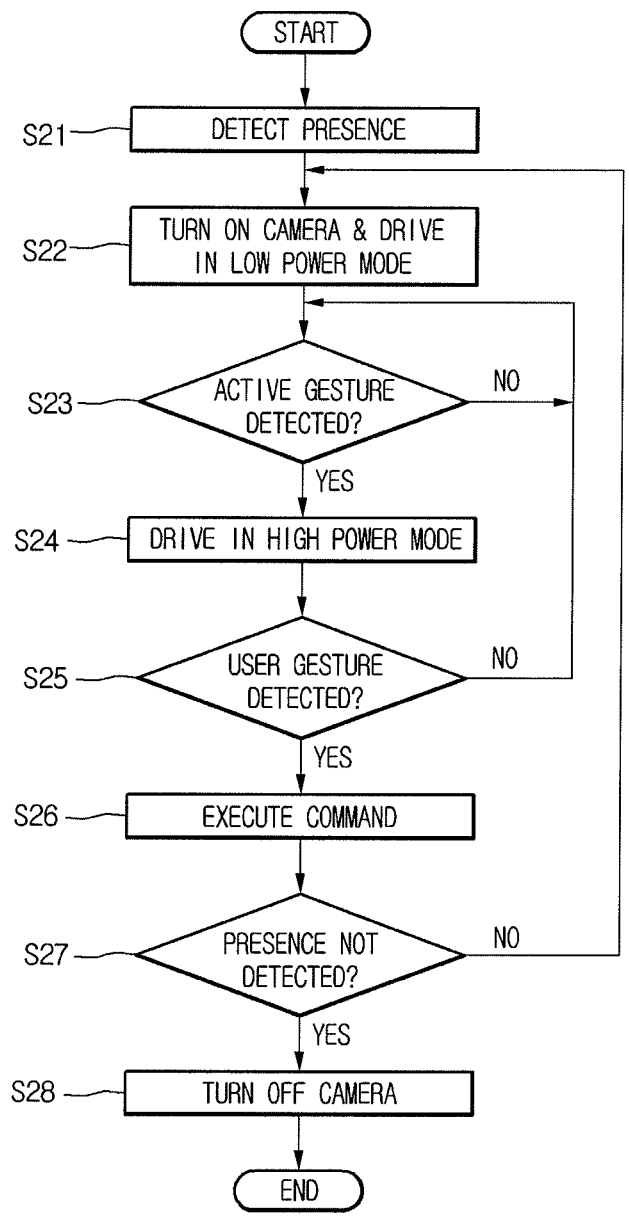
FIG. 8 is a flowchart illustrating a method of controlling a power of a camera having a plurality of power modes with a presence sensor, according to an embodiment of the present invention.

FIG. 8 is a flowchart illustrating a method of controlling a power of a camera having a plurality of power modes with a presence sensor, according to an embodiment.

Referring to FIG. 8, the presence sensor 26 detects the presence of a user in operation S21. As a result, the camera 20 is turned on and driven in a low power mode in operation S22. When an active gesture is detected in operation S23 (the camera is driving in the low power mode), the camera 20 is driven in a high power mode in operation S24.

Then while the camera is operating in the high power mode, if a user gesture is detected in operation S25, the camera 20 executes a command corresponding to the detected user gesture in operation S26. While the camera 20 is driven in the high power mode, if a user gesture is not detected for a certain time duration, the camera 20 again returns to the low power mode.

When the presence of the user is no longer detected in operation S27, the camera 20 is turned off in operation S28. When the presence of the user is continuously detected, the camera 20 is continuously turned on in operation S22.

According to an embodiment, the camera 20 may operate without the presence sensor 26 for detecting the presence of the user. The camera 20 operates in an ultra power mode for detecting only the presence of the user, and then when the presence of the user is detected by the camera 20, the camera 20 may switch to a mode for detecting the user's gesture and operate as discussed above.

Figure 9:
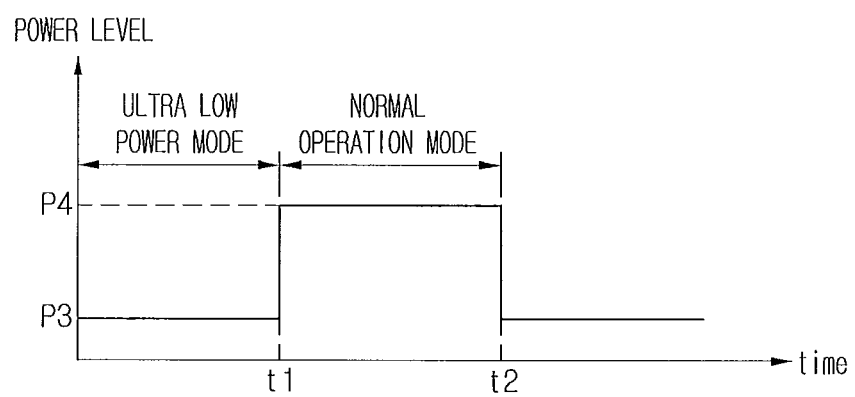
FIG. 9 is a diagram illustrating a method which detects presence of a user with a camera and drives the camera, according to an embodiment of the present invention.

FIG. 9 is a diagram illustrating a method which detects presence of a user with a camera and drives the camera, according to an embodiment.

Referring to FIG. 9, when a user does not exist near the computing device 10, i.e., when the presence of the user is not detected, the camera 20 operates in an ultra-low power mode for detecting only the presence of the user. In the ultra low power mode, the camera 20 is driven at a low power level P3.

In the ultra low power mode, the frame rate of the camera 20 is considerably reduced. For example, the frame rate may be reduced to about one frame per second. The camera 20 captures an image at every second and compares the captured image with a previously captured image to determine whether there is a difference, and therefore, the proximity or presence of the user near the computing device may be detected.

Although the presence of the user is not detected, the camera 20 may be automatically turned on when the computing device 10 is in a turn-on state and an application requiring a user input is executed in the computing device 10.

When the presence of the user is detected at a time t1, the camera 20 operates in a normal operation mode, i.e., a state for detecting the user's various gestures for inputting commands. In FIG. 9, the camera 20 operates at a power level P4, in the normal operation mode. When the presence of the user is not detected or there is no user's gesture input for longer than a certain time duration, the power mode of the camera 20 again returns to the ultra low power mode at a time t2.

When the camera 20 is in a state for detecting the user's gestures, i.e., when the camera 20 is driven at a power level P4, this may be displayed to the user. For example, an indicator such as LED may be disposed in one side of the camera 20, and thus it may display that the camera 20 is driven at the power level P4.

According to an embodiment, even when the camera 20 is driven in a normal mode, it may be driven in a plurality of power modes. Similarly to the embodiment that has been described above with reference to FIG. 6, the normal power mode may be divided into a low power mode in which the user may input a gesture for activating the camera 20 in order to initiate a gesture input and a high power mode in which the camera 20 may substantially receive and process all the user's gestures, and the camera 20 may be driven the low power mode or the high power mode.

Figure 10:
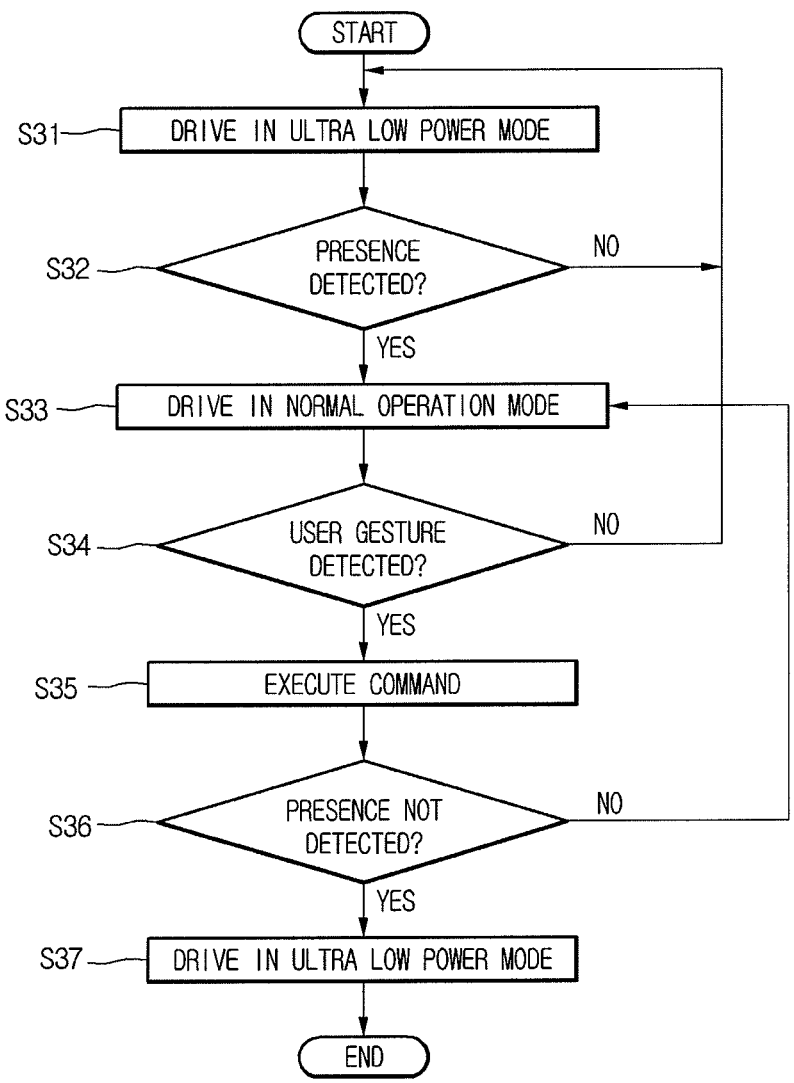
FIG. 10 is a flowchart illustrating a method which detects presence of a user with a camera and drives the camera, according to an embodiment of the present invention.

FIG. 10 is a flowchart illustrating a method which detects presence of a user with a camera and drives the camera, according to an embodiment.

Referring to FIG. 10, the camera 20 is driven in an ultra low power mode in operation S31. In the ultra low power mode, the camera 20 may determine only the presence of a user in front of or near the camera 20 or computing device 10. When the presence of the user is detected in operation S32, the camera 20 is driven in a normal operation mode in operation S33. In the normal operation mode, the camera 20 may detect the user's gesture(s) and execute command(s) corresponding to the detected gesture(s). When the user's gesture is detected in operation S34, the camera 20 executes a command corresponding to the detected gesture in operation S35. When the user's gesture is not detected for longer than a certain time period in operation S34, the camera 20 returns to an ultra low power mode.

When the presence of the user is no longer detected in operation S36, the camera 20 is driven in the ultra low power mode in operation S37 (or S31). When the presence of the user is continuously detected, the camera 20 is driven in a normal operation mode and maintains a state that continuously waits the user's gesture (S33).

Figure 11:
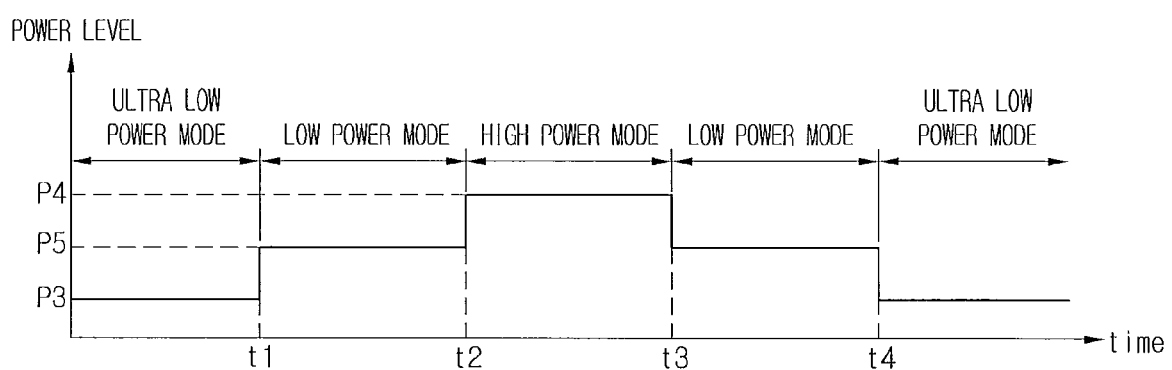
FIG. 11 is a diagram illustrating a method which detects presence of a user with a camera to drive the camera and thereafter drives the camera in a plurality of power modes of the present invention.

FIG. 11 is a diagram illustrating a method which detects presence of a user with a camera to drive the camera and thereafter drives the camera in a plurality of power modes.

Referring to FIG. 11, when the presence of a user is not detected, e.g., when the user is far away from the computing device 10 or the camera 20, the camera 20 is driven in an ultra low power mode, at a power level P3. When the presence of the user is detected at a time t1, the camera 20 may be driven in a low power mode. At this point, the camera 20 may operate at a power level P5. In the low power mode, the power level of the camera 20 increases, but it increases only by the degree in which the camera 20 may detect only the user's large and slow gestures such as a camera activation gesture.

At a time t2, when the user inputs a predetermined camera activation gesture, the camera 20 is activated and operates in a high power mode. In the high power mode, the user may input gestures for controlling the computing device 10. The camera 20 may capture a faster and smaller gesture in the high power mode than the low power mode, so that the captured gestures can be analyzed by the computing device 10. Therefore, the camera 20 may capture more gestures in the high power mode than the low power mode.

In the high power mode, when there is no user input for a certain time period or a user input for returning to the low power mode is inputted, the camera 20 returns to the low power mode (P5) at a time t3. When the presence of the user is not detected, the camera 20 returns to an ultra low power mode (P3) at a time t4.

Figure 12:
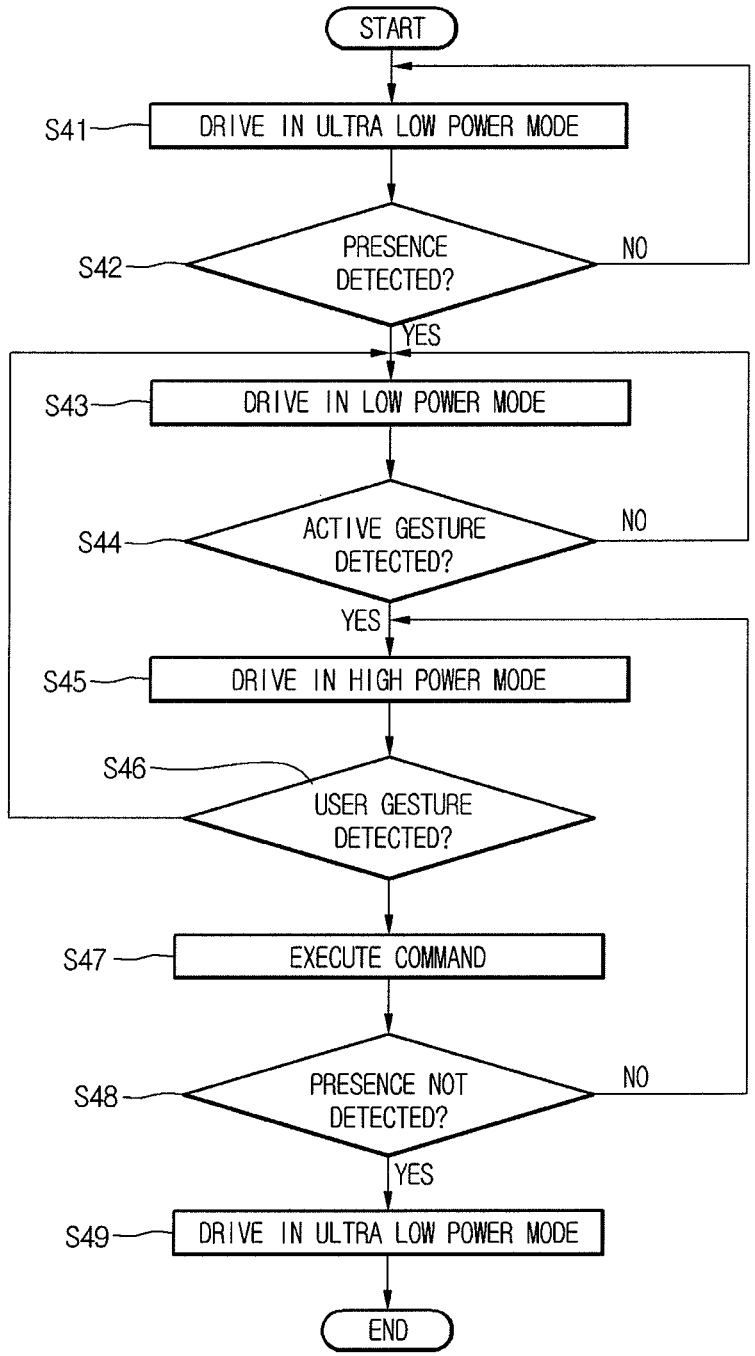
FIG. 12 is a flowchart illustrating a method of detecting presence of a user with a camera, according to an embodiment of the present invention.

FIG. 12 is a flowchart illustrating a method of detecting presence of a user with a camera, according to an embodiment.

Referring to FIG. 12, the camera 20 is driven in an ultra low power mode in operation S41. When the camera 20 detects the presence of a user in operation S42, it is driven in a low power mode in operation S43. When a camera activating gesture ('active gesture') is detected in operation S44, the camera 20 is driven in the high power mode in operation S45. Then the camera 20 detects the user's gesture(s) for performing various functions/operations in the computing device 10 in operation S46, and executes command(s) corresponding to the detected gesture(s) in operation S47.

When the active gesture is not detected in operation S44, the camera 20 continuously maintains the low power mode and waits (S43). Moreover, when the camera 20 enters into the high power mode, and thereafter when the user's gesture is not detected for longer than a certain time period in operation S46, the camera 20 returns to the low power mode (S43).

When the presence of the user is no longer detected in operation S48, the camera 20 is driven in an ultra low power mode in operation S49 (or S41). When the presence of the user is continuously detected, the camera 20 maintains the high power mode (S45), and then it executes a command or returns to the low power mode according to whether the user's gesture is detected.

Figure 13:
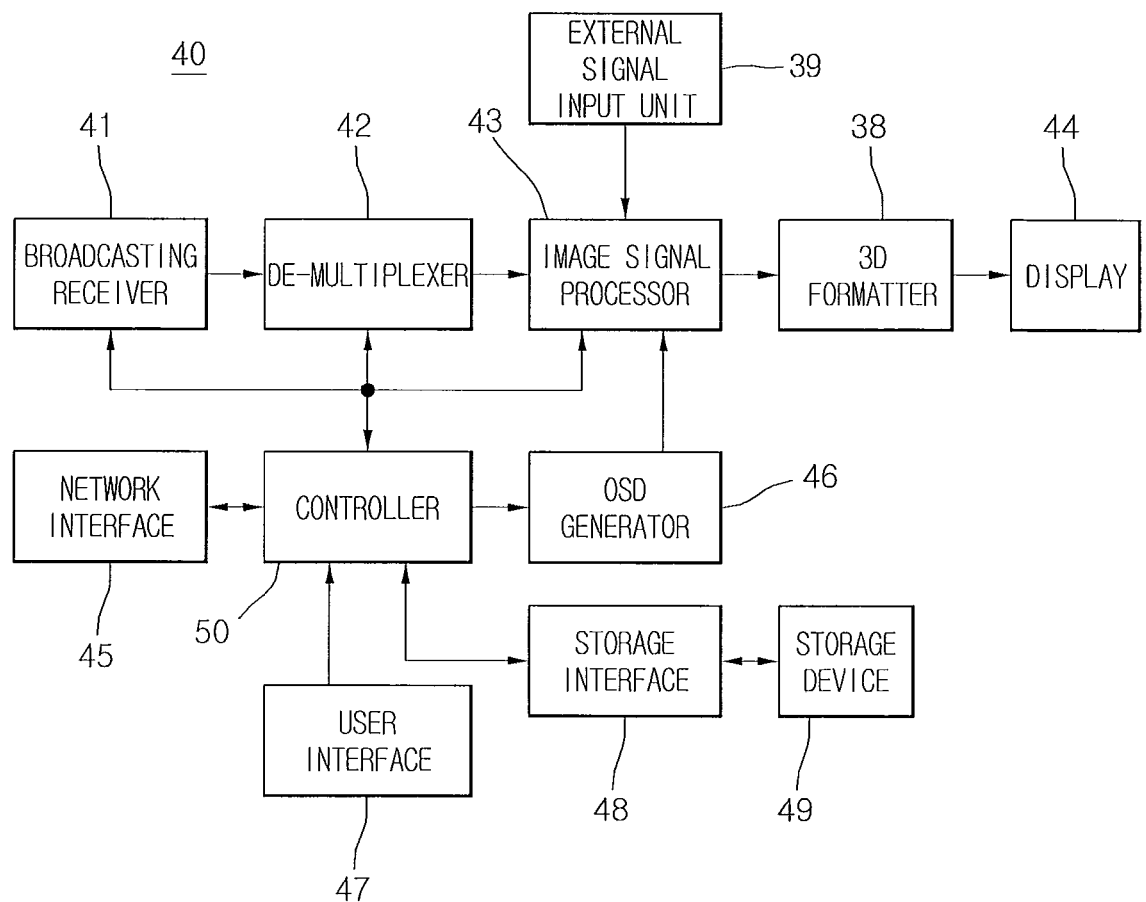
FIG. 13 is a block diagram illustrating a broadcasting reception apparatus as an example of a computing device which applies a power control method of a camera according to an embodiment of the present invention.

FIG. 13 is a block diagram illustrating a broadcasting reception apparatus as an example of a computing device which applies a power control method of a camera according to an embodiment. That is, the broadcasting reception apparatus performs the above-discussed methods of the computing device according to the present invention.

Referring to FIG. 13, a broadcasting reception apparatus 40 includes a broadcasting receiver 41, a de-multiplexer 42, an image signal processor 43, a display 44, a network interface 45, an On-Screen Display (OSD) generator 46, a user interface 47, a storage interface 48, a storage device 49, an external signal input unit 39, and a controller 50, all operatively coupled.

The controller 50, storage device 49 and external signal input unit 39 of the broadcasting reception apparatus 40 correspond to the controller 11, storage unit 14 and camera interface 13 of the computing device 10 of FIG. 2, respectively.

Among the elements, the broadcasting receiver 41, the de-multiplexer 42 and the image signal processor 43 may configure one broadcasting processor that receives a broadcasting signal and processes the broadcasting signal into a type outputtable by the display 44 through various processing.

When content is digital broadcasting, a digital broadcasting signal is transmitted as a transport stream type that is packetized by time-division multiplexing an audio signal, a video signal and additional data.

The broadcasting receiver 41 may include an antenna that receives a broadcasting signal transmitted from the outside. Also, the broadcasting receiver 41 may include a tuner and a demodulator. Herein, the tuner tunes a broadcasting signal having a corresponding frequency band according to the tuning control signal of the controller 50. The demodulator outputs the tuned broadcasting signal of a specific channel as a transport stream type through a Vestigial Sideband (VSB) demodulating operation and an error correcting operation.

A broadcasting signal received through the broadcasting receiver 41 is divided into all kinds of additional data which are defined as an audio signal, a video signal and Program and System Information Protocol (PSIP) information by the de-multiplexer 42, and is outputted as a bit stream type.

Video data divided through the de-multiplexer 42 is processed by the image signal processor 43 and is displayed on the display 44.

At this point, the image signal processor 43 includes an MPEG-2 decoder, and a scaler that converts video data to be suitable for a vertical frequency, a resolution and a screen rate in accordance with the output standard of the display 44.

Herein, the display 44 may use various types of displays such as Digital Light Processing (DLP), Liquid Crystal Display (LCD) and Plasma Display Panel (PDP).

An audio signal is processed by an audio signal processor (not shown) and outputted to a speaker, and the audio signal processor may include an ACA-3 decoder.

Additional data included in additional data that is divided by the de-multiplexer 42 is stored in the storage device 49 through the storage interface 48.

The storage device 49 may be implemented with EEPROM.

The user interface 47 is a means for receiving a request command from a user, and may include an infrared receiver that receives an infrared signal inputted through a remote controller or a local key input unit included in one side of a panel.

The network interface 45 receives contents or data from a content provider or a network operator over a network. That is, the network interface 45 receives contents, which are provided from the content provider over the network, such as broadcasting, games, VOD and broadcasting signals, and relevant information thereof. Also, the network interface 45 receives the updated information of a firmware and an updated file that are provided from the network operator.

The OSD generator 46 generates a menu screen for receiving the user's determination signal as an OSD type.

That is, the OSD generator 46 may display content that is received through the network interface 45 and relevant information thereof, on the display 44.

The external signal input unit 39 is an interface that may receive an input from another player, for example, a DVD player or a game machine. By connecting the other player to the external signal input unit 39, multimedia stored in the player may be outputted on the display 44.

The controller 50 performs an overall control operation based on a command that is inputted from the user interface 47. The controller 50 receives and executes the software (i.e., the updated file of a firmware) of the content provider that is received from the network operator.

According to embodiments, the broadcasting reception apparatus 40 may output a Three-Dimensional (3D) image. The menu screen of the broadcasting reception apparatus 40 may be provided as a 3D screen, and even when content provided by the content provider is 3D content, the broadcasting reception apparatus 40 may receive and output the 3D content.

For realizing a 3D image, as illustrated in FIG. 13, a 3D formatter 38 is disposed in an output terminal of the image signal processor 43. The 3D formatter 38 converts an image processed by the image signal processor 43 into a 3D image and transfers the 3D image to the display 44. According to embodiments, the OSD generator 46 may include a separate 3D formatter that converts an OSD output into a 3D output.

The methods according to embodiments may be implemented as programs executable in general processors such as computers, and particularly, may be implemented with a flash application or a 3D flash application. The implemented programs may be stored in a computer readable recording medium in a network TV. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A computing device controllable by a user's gesture, the computing device comprising:
  a presence detector configured to detect a presence of the user within a predetermined area from a camera that is turned off;

a controller configured to:
control the presence detector,
turn on the camera, when the presence of the user is detected,
drive the camera in a low power mode to detect a first gesture of the user,
drive the camera in a high power mode to detect a second gesture of the user, when the first gesture of the user is detected, and
execute a command corresponding to the second gesture of the user, when the second gesture of the user is detected,
wherein the first gesture is an active gesture, the second gesture is one of all gestures, and the low power mode and the high power mode are selectively driven by controlling an illumination intensity of the camera; and
a display unit configured to display information indicating that the camera has entered into a mode for detecting the gesture of the user.

2. The computing device according to claim 1, wherein when the camera is in the high power mode, the camera provides a more intense illumination than in the low power mode.

3. The computing device according to claim 1, wherein the camera is integrated into the computing device or is an external device.

4. The computing device according to claim 1, wherein the presence detector is one of a thermal infrared sensor, an ultrasonic sensor and an infrared sensor integrated into the computing device.

5. The computing device according to claim 1, wherein the computing device is one of a television (TV), a game machine, a portable phone and a set-top box.

6. The computing device according to claim 1, wherein the controller is further configured to return the camera to a state before the detection of the presence, when the presence of the user is detected and the turn-on gesture is not detected within a certain time period.

7. The computing device according to claim 1, wherein the camera is an infrared camera.

8. A computing device controllable by a user's gesture, the computing device comprising:
a controller configured to control a camera so that the camera is turned on when a presence of the user is detected within a predetermined area,
to drive the camera in a low power mode to detect a first gesture of the user,
to switch the low power mode of the camera to a high power mode for detecting a second gesture of the user when the first gesture is detected, and
to execute a command corresponding to the second gesture of the user when the second gesture of the user is detected,
wherein the lower power mode and the high power mode are selectively driven by controlling an illumination intensity of the camera; and
a display unit configured to display information indicating that the camera has entered into a mode for detecting the gesture of the user.

9. The computing device according to claim 8, wherein the camera is integrated into the computing device or is an external device.

10. The computing device according to claim 8, wherein the controller is further configured to switch the computing device from a standby mode to a normal mode when the camera is switched to the high power mode.

11. The computing device according to claim 10, wherein the controller is further configured to perform at least one function according to the gesture of the user when the computing device is operating in the normal mode.

12. A method of controlling a computing device controllable by a user's gesture, the method comprising:
detecting, by a presence detector of the computing device, a presence of the user within a predetermined area from a camera that is turned off;
turning on the camera, when the presence of the user is detected;
driving the camera in a low power mode to detect a first gesture of the user;
driving the camera in a high power mode to detect a second gesture of the user, when the first gesture of the user is detected; and
executing a command corresponding to the second gesture of the user, when the second gesture of the user is detected,
wherein the first gesture is an active gesture, and the second gesture is one of all gestures, and
wherein the low power mode and the high power mode are selectively driven by controlling an illumination intensity of the camera.

13. The method according to claim 12, wherein when the camera is in the high power mode, the camera provides a more intense illumination than in the low power mode.

14. The method according to claim 12, wherein the camera is integrated into the computing device or is an external device.

15. The method according to claim 12, wherein the presence detector is one of a thermal infrared sensor, an ultrasonic sensor and an infrared sensor integrated into the computing device.

16. The method according to claim 12, wherein the computing device is one of a television (TV), a game machine, a portable phone and a set-top box.

17. The method according to claim 12, further comprising:
returning the camera to a state before the detection of the presence, when the presence of the user is detected and the turn-on gesture is not detected within a certain time period.

18. The method according to claim 12, wherein the camera is an infrared camera.

19. A method of controlling a computing device controllable by a user's gesture, the method comprising:
turning on a camera when a presence of the user is detected within a predetermined area to operate the camera in a low power mode for detecting a first gesture of the user;
switching the lower power mode of the camera to a high power mode for detecting a second gesture of the user, when the first gesture is detected; and
executing a command corresponding to the second gesture of the user when the second gesture of the user is detected,
wherein the low power mode and the high power mode are selectively driven by controlling an illumination intensity of the camera.

20. The method according to claim 19, wherein the camera is integrated into the computing device or is an external device.

21. The method according to claim 19, further comprising:
switching the computing device from a standby mode to a normal mode when the camera is switched to the high power mode.

22. The method according to claim 21, further comprising:
performing at least one function according to the gesture of the user when the computing device is operating in the normal mode.

* * * * *